United States Patent
Eden

[15] 3,664,968
[45] May 23, 1972

[54] CATALYST FOR PREPARING UNSATURATED ACIDS AND ALDEHYDES

[72] Inventor: Jamal S. Eden, Akron, Ohio

[73] Assignee: The B. F. Goodrich Company, New York, N.Y.

[22] Filed: Aug. 3, 1970

[21] Appl. No.: 67,647

Related U.S. Application Data

[60] Division of Ser. No. 683,476, Nov. 16, 1967, Pat. No. 3,576,857, which is a continuation-in-part of Ser. No. 483,858, Aug. 30, 1965, abandoned.

[52] U.S. Cl..........................252/437, 260/533 N, 260/604 R
[51] Int. Cl. .........................................................B01j 11/82
[58] Field of Search ......................260/533 N, 604; 252/437

[56] References Cited

UNITED STATES PATENTS

| | | | |
|---|---|---|---|
| 3,320,331 | 5/1967 | Gaspar et al. | 252/437 X |
| 3,396,189 | 8/1968 | Eden | 252/437 X |

*Primary Examiner*—Patrick P. Garvin
*Attorney*—J. Hughes Powell, Jr. and Ernest K. Bean

[57] ABSTRACT

Unsaturated aldehydes and carboxylic acids as acrolein or methacrolein and acrylic acid or methacrylic acid are obtained by the reaction of propylene or isobutylene with oxygen at an elevated temperature in the presence of a catalyst containing a mixture of molybdenum oxide, tellurium oxide and an aluminum phosphate.

4 Claims, No Drawings

CATALYST FOR PREPARING UNSATURATED ACIDS AND ALDEHYDES

CROSS REFERENCE TO RELATED APPLICATION

This is a division of Ser. No. 683,476, filed Nov. 16, 1967 now U.S. Pat. No. 3,576,857 which was a continuation-in-part of copending application Ser. No. 483,858 filed Aug. 30, 1965, now abandoned.

BACKGROUND OF THE INVENTION

Numerous attempts have been made in the past to prepare products of higher oxidation state from hydrocarbons, especially from the normally gaseous hydrocarbons. However, all prior catalysts and procedures for oxidizing monoolefinic gaseous hydrocarbons to monoolefinically unsaturated aldehydes or monoolefinically unsaturated carboxylic acids with the same number of carbon atoms as the hydrocarbon having serious shortcomings. The catalysts either have a very short active life, or they convert only a portion of the hydrocarbon to desired end groups per pass; they oxidize the hydrocarbon excessively to form high proportions of carbon monoxide or carbon dioxide or both; they are not sufficiently selective, so that the hydrocarbon molecule is attacked at both the olefinic unsaturation and at a methyl group; or the oxidation of the olefin does not proceed beyond the aldehyde stage. Catalysts are desirable to provide a mixture of unsaturate aldehydes and unsaturated carboxylic acids.

SUMMARY OF THE INVENTION

Mixtures of acrolein and acrylic acid or methacrolein and methacrylic acid are obtained in good yields by oxidation of propylene or isobutylene at elevated temperatures of about 300° to 550°C. in the presence of novel catalysts containing a mixture of molybdenum oxide, tellurium oxide and an aluminum phosphate in molar ratios of 100 $MoO_3$, 10–100 $TeO_2$ and 10–100 of an aluminum phosphate. The catalysts can also be designated as $Mo_{10}Te_{1-10}Al_{2-20}P_{2-30}O_{40-155}$ with P being in the form of a phosphate wherein each P is attached to 3 or 4 oxygen atoms. Such catalysts will convert about 100 mol percent of propylene, for example, of which about 75 percent is acrolein and acrylic acid.

DETAILED DESCRIPTION

The Reactants

The essential reactants are (1) propylene or isobutylene and (2) an oxygen containing gas, which can be pure oxygen, oxygen diluted with an inert gas, oxygen enriched air or air without additional oxygen. For reasons of economy, air is the preferred oxygen containing reactant.

For the purpose of this invention the hydrocarbons which are oxidized, propylene and/or isobutylene, can be defined generically by the formula

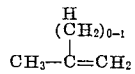

wherein the end products formed, acrolein and acrylic acid or methacrolein and methacrylic acid, result from the oxidation of only one methyl group on the hydrocarbon molecule while the terminal $CH_2 = C<$ remains intact.

Stoichiometric ratios of oxygen to olefin for the purpose of this invention are 1.5 or 1. Slightly lower amounts of oxygen can be used at a sacrifice of yield. It is preferred, however, to use 33 to 66 percent excess oxygen. Larger excesses do not impair the yields of aldehydes and acids, but for practical considerations an excess much above 100 percent would require extremely large equipment for a given production capacity particularly when the source of oxygen is air. 1.5 to 4 mols of oxygen per mol of hydrocarbon represents a useful range.

The addition of steam into the reactor along with the hydrocarbon and oxygen containing gas is desirable but not absolutely essential. The function of steam is not clear, but it seems to reduce the amount of carbon monoxide and dioxide in the effluent gases.

Other diluent gases can be used. Surprisingly, saturated hydrocarbons such as propane are rather inert under the reaction conditions. Nitrogen, argon, krypton or other known inert gases can be used as diluents if desired but are not preferred because of the added cost.

THE CATALYST AND ITS PREPARATION

There are several methods for the preparation of the catalyst, which can be supported or unsupported. It is possible to dissolve each of the starting ingredients in water and combine them from the aqueous solutions or the ingredients can be dry blended. Because of the more uniform blend obtained by the solution procedure, it is preferred.

The general procedure for preparing a catalyst from water soluble ingredients is to dissolve the requisite amount of a molybdenum salt, a tellurium salt and an aluminum salt in water. Add the requisite amount of phosphoric acid to the aluminum salt solution. Add the tellurium salt solution to the molybdenum salt solution and then add the aluminum salt — phosphoric acid mixture to the molybdenum — tellurium slat mixture. The catalyst is then dried and baked at 400° C. for about 16 hours.

Supported catalysts can be prepared by adding a dry support or an aqueous slurry thereof to the aqueous solution of catalyst or the aqueous catalyst ingredients can be added to the slurry of the support.

Alternatively a slurry of the catalyst ingredients can be prepared in water, then dried and baked. For supported catalysts the aqueous slurry of the catalyst ingredients can be added to an aqueous suspension of the support or vice versa, and then dried and baked.

Another method is to blend the dry ingredients of the desired particle size and then mix them thoroughly. Thorough blending and uniform particle size is desired.

A specific example of the solution method is now set forth. In this procedure the ingredients are precipitated on blending.

a. Dissolve 105.96 g. of ammonium molybdate in 130 ml. of distilled water.

b. Dissolve 31.922 g. $TeO_2$ in 70 ml. of concentrated HCl.

Add the tellurium salt solution to the ammonium molybdate solution. A precipitate forms.

c. Dissolve 95.58 g. of $AlCl_3 \cdot 6 H_2O$ in water and add 46.2 g. of 85 percent $H_3PO_4$. Add this mixture slowly to the precipitated ammonium molybdate-$TeO_2$ mixture.

Dry on a steam bath and bake for 16 hours at 400° C. Thereafter, the catalyst is ground to the desired mesh size and sieved. For supported catalysts an aqueous slurry of the support can be added to the catalyst ingredients, or vice versa, prior to drying and baking.

A supported catalyst may be prepared by adding to (c) 240 grams of an aqueous colloidal dispersion of microspheroidal silica in a concentration of 30–35 percent $SiO_2$ (Ludox H.S.). The silica may also be added to one of the individual ingredients or (c) added to the silica dispersion.

Among the suitable supports are silica, silica containing materials, such as diatomaceous earth, kieselguhr, silicon carbide, clay, aluminum oxides and even carbon, although the latter tends to be consumed during the reaction.

Catalysts with molar ratios of 100 Mo, 10–100 Te and 10–100 of an aluminum phosphate are used successfully for oxidizing the monoolefinic hydrocarbon to aldehyde and/or carboxylic acid. The catalyst contains chemically bound oxygen so that the generic formula can be written as $MoO_3$ $_{100}TeO_2$ $_{10-100}AlPO_4$ or other aluminum phosphate $_{10-100}$.

REACTION CONDITIONS

The reaction can be carried out in either a fixed or fluidized catalyst bed.

The reaction temperature can range from about 300° to 450° C. for the oxidation of propylene but the preferred range is from about 350° C. to about 450° C. Below 350° C. the conversion per pass is lower and low temperature tends to produce more aldehyde than desired. Usually, a longer contact time is needed at lower temperatures to obtain the yields of desired products obtainable at higher temperatures. Above 425° C. in the propylene oxidation some of the desired end products appear to be oxidized to carbon oxides. This is much more apparent at 450° C. For isobutylene, oxidation temperatures of 350°–550° C. are desirable with the preferred range being 350°–450° C.

The molar ratio of oxygen to propylene or isobutylene should be at least 2 to 1 for good conversion and yields. Some excess oxygen, 33 to 66 mol percent is even more desirable and is preferred. There is no critical upper limit as to the amount of oxygen, but when air is used as the oxygen containing gas it becomes apparent that too great an excess will require large reactors, pumping, compressing and other auxiliary equipment for any given amount of desired end product. It is therefore best to limit the amount of air to provide a 33 to 66 percent excess of oxygen. This range provides the largest proportion of acid, under given reaction conditions. Also, since care is needed to avoid an explosive mixture, the limiting of air aids in that direction.

The molar ratio of steam to propylene or isobutylene can range from 0 to about 5 to 7, but best results are obtained with molar ratios of about 3 to 5 per mol of olefin and for this reason are preferred.

The contact time can vary considerably in the range of about 2 to 70 seconds. Best results are obtained in a range of about 8 to 54 seconds and this range is preferred. Longer contact times usually favor the production of acid at any given temperature.

The particle size of catalyst for fixed bed operations used is from 10 – 18 mesh. As is known, for fixed beds, the size may be of a wider range particle size. For fluid bed systems the catalyst size should be from 80 – 325 mesh (U.S. Sieve).

The reaction can be run at atmospheric pressure, in a partial vacuum or under induced pressure up to 50 – 100 psi. Atmospheric pressure is preferred for fixed bed systems and a pressure of 1 to 100 psi for fluid bed reactions. Operation at a pressure which is below the dew point of the unsaturated acid at the reaction temperature is advantageous.

The data in the examples show that wide variations in percentages of unsaturated acids and aldehydes can be obtained with a single catalyst, using fixed ratio of reactants but changing the temperature and/or contact time. Further variation is obtainable by controlling the other variables in the reaction including the catalyst compositions within the limits set forth herein.

The examples are intended to illustrate the invention but not to limit it.

THE EXAMPLES

A series of runs was made in a fixed bed reactor of a high silica (Vycor) glass tube 12 inches long and 30 mm. outer diameter. The reactor had three inlets, one for air, one for steam and one for propylene. Three external electrically operated heating coils were wound on the reactor. One of the coils extended along the entire length of the reactor and each of the remaining coils extended only about one half the length of the reactor.

Outlet vapors were passed through a short water-cooled condenser. Uncondensed gases were passed through a gas chromatograph (Perkin-Elmer model 154D) and analyzed continuously. The liquid condensate was weighed and then analyzed for acrylic acid and acrolein in the gas chromatograph.

The reactor was filled to about 90 percent of its capacity with 170 ml. of a catalyst made by the solution method described above, using a ratio of 75 $MoO_3$, 25 $TeO_2$ and 50 $AlPO_4$. Empirically the catalyst is $Mo_{100}Te_{33.33}Al_{66.6}P_{66.6}O_{633.3}$ and the P is present as $-PO_4$. The catalyst was not supported and had a mesh size of 10–18 (U.S. Sieve).

Steam at a temperature of 200°–250° C. was first passed into the reactor. Then propylene and air were separately fed into the stream of water vapor. This mixture then passed through a pre-heater and entered the reactor at about 200°–250° C. The reactor was pre-heated to about 285° C. before the gas feed was begun.

The ratio of reactants was about 2.955 mols of oxygen and 4.36 mols of steam per mol of propylene. Cold contact time was 22.5 seconds.

The reaction temperature was varied as the reaction proceeded.

The table below summarizes the data obtained in these runs:

| Run No. | Temp. °C. | Mol % Propylene Converted | Mol % Yield on Propylene Converted | |
|---|---|---|---|---|
| | | | Acr. | AA |
| 1 | 375 | 99.3 | 47.35 | 28.05 |
| 2 | 400 | 100 | 22.58 | 29.85 |

The mol % efficiency was essentially the same as the yields.

Acr. = Acrolein
AA = Acrylic Acid

I claim:

1. A catalyst composition consisting essentially of, in molar ratio, 100 molybdenum oxide, 10–100 tellurium oxide and 10–100 of an aluminum phosphate as essential catalyst ingredients.

2. A catalyst composition of claim 1 consisting essentially of in molar ratio, 100 $MoO_3$, 10–100 $TeO_2$ and 10–100 $AlPO_4$.

3. A composition of claim 2 wherein said catalyst is supported on a silica support.

4. A composition of claim 2 having a molar ratio of about 75 $MoO_3$, 25 $TeO_2$ and 50 $AlPO_4$.

* * * * *